A United States Patent

Kobayashi et al.

(10) Patent No.: US 8,817,373 B2
(45) Date of Patent: Aug. 26, 2014

(54) MICROCRACK FREE POLARIZATION PLATE

(75) Inventors: Kanto Kobayashi, Ibaraki (JP); Kanji Nishida, Ibaraki (JP); Naoki Tomoguchi, Ibaraki (JP); Youichirou Sugino, Ibaraki (JP); Takaichi Amano, Ibaraki (JP); Kazuo Kitada, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 705 days.

(21) Appl. No.: 12/666,994

(22) PCT Filed: Jul. 3, 2008

(86) PCT No.: PCT/JP2008/062076
§ 371 (c)(1),
(2), (4) Date: Dec. 28, 2009

(87) PCT Pub. No.: WO2009/008329
PCT Pub. Date: Jan. 15, 2009

(65) Prior Publication Data
US 2011/0019274 A1      Jan. 27, 2011

(30) Foreign Application Priority Data

Jul. 6, 2007    (JP) .................................. 2007-178239

(51) Int. Cl.
*G02B 5/30*    (2006.01)

(52) U.S. Cl.
USPC ................................ 359/487.01; 359/489.01

(58) Field of Classification Search
None
See application file for complete search history.

(56) References Cited

U.S. PATENT DOCUMENTS

| 2004/0105072 A1* | 6/2004 | Qin et al. ....................... 351/163 |
| 2005/0153079 A1 | 7/2005 | Hieda et al. |
| 2006/0066946 A1 | 3/2006 | Liu et al. |
| 2006/0096962 A1 | 5/2006 | Park |
| 2008/0113119 A1 | 5/2008 | Tsujiuchi et al. |

FOREIGN PATENT DOCUMENTS

| JP | 11-038227 A | 2/1999 |
| JP | 2001-100032 A | 4/2001 |
| JP | 2004045893 A * | 2/2004 |
| JP | 2005189530 A * | 7/2005 |
| JP | 2005-208607 A | 8/2005 |
| JP | 2006243216 A * | 9/2006 |
| JP | 2006-317747 A | 11/2006 |
| TW | I259295 B | 8/2006 |
| TW | I274617 B | 3/2007 |
| TW | I274664 B | 3/2007 |
| TW | I279596 B | 4/2007 |
| WO | 2006-112207 A1 | 10/2006 |
| WO | 2007-026659 A1 | 3/2007 |

OTHER PUBLICATIONS

International Search Report of PCT/JP2008/062076, mailing date of Sep. 22, 2008.

* cited by examiner

*Primary Examiner* — Arnel C Lavarias
(74) *Attorney, Agent, or Firm* — Westerman, Hattori, Daniels & Adrian, LLP

(57) ABSTRACT

An end face of a polarization plate cut by laser becomes a substantially flat surface having only sloping micro waviness because of having been melted once to be solidified. Since the surface has few stress-concentrated parts that may cause microcracks, this prevents microcracks from easily being produced.

10 Claims, 9 Drawing Sheets

10

X Profile

Y Profile

PRIOR ART

PRIOR ART

X Profile

Y Profile

PRIOR ART

X Profile

Y Profile

PRIOR ART

50

PRIOR ART

MICROCRACK FREE POLARIZATION PLATE

FIELD OF THE INVENTION

The present invention relates to a polarization plate used for a liquid crystal panel, more particularly to a polarization plate having features in surface structure of a peripheral end face.

BACKGROUND OF THE INVENTION

FIG. 14 shows a schematic view of one example of a conventional polarization plate 50 to be used for a liquid crystal panel. The polarization plate 50 is a multi-layered plate on which a polarizer 51 and a pair of transparent polarizer protective films 52a and 52b are laminated with adhesive layers 53a and 53b. A film stretched in one direction after containing a dichromatic dye, such as an iodine complex or the like in a polyvinyl alcohol (PVA)-based film is used as the polarizer 51. Stretching the film in one direction enables the dichromatic dye to be oriented in a stretching direction together with polyvinyl alcohol molecules, which leads to have polarization functions. However, the mechanical strength of the polyvinyl alcohol-based film itself is low. Thus, the stretched polyvinyl alcohol-based film can easily shrink and is apt to be deformed under humidified conditions wherein moisture in air is absorbed. Accordingly, it is difficult to use the polarizer 51 alone as a polarization plate.

Therefore, the polarizer protective films 52a and 52b are bonded to both sides of the polarizer 51 with the adhesive layers 53a and 53b to reinforce the mechanical strength and humidity resistance so as to be used as the polarization plate 50. The polarizer protective films 52a and 52b made of transparent triacetyl cellulose (TAC) based-resin have been widely used. The adhesive layers 53a and 53b wherein a cross linking agent is being mixed with a polyvinyl alcohol aqueous solution have been widely used. The polarizer 51 has a thickness of about 60 μm, the polarizer protective films 52a and 52b respectively have a thickness of about 80 μm and the adhesive layers 53a and 53b respectively have a thickness of about 100 nm.

The typical configuration of the conventional polarization plate 50 comprises: the polarizer protective film 52a made of transparent triacetyl cellulose-based resin (thickness: 80 μm)/ the adhesive layer 53a made of polyvinyl alcohol-based resin (thickness 100 μm)/the polarizer 51 (thickness: 60 μm)/the adhesive layer 53b made of polyvinyl alcohol-based resin (thickness: 100 μm)/the polarizer protective film 52b made of transparent triacetyl cellulose-based resin (thickness: 80 μm).

The material of a polarization plate is generally made longer than a liquid crystal panel. A rectangular-shaped polarization plate in the size of a liquid crystal panel is cut out from such an elongated polarization plate material. For instance, in the case of the conventional polarization plate 50, the polarization plate 50 in the size of a liquid crystal panel has been cut out from the material of the polarization plate using a cutter for punching.

However, when cutting out is carried out using a cutter for punching, threadlike film fracture pieces may be produced on an end face of the cut away polarization plate 50. Such threadlike fracture pieces need to be removed because such fracture pieces cause deterioration in quality.

Conventionally, the threadlike fracture pieces of the end face of the polarization plate 50 have been cut with a rotating knife (Japanese Patent Publication No. 2004-16763 A). Fullback machining with a milling machine is suitable for removing and machining the threadlike fracture pieces with the rotating knife. When the end face of the polarization plate 50 is practically cut by fullback machining, it is efficient to work end faces of a plurality of polarization plates 50 all together, where the plurality of polarization plates 50 in the size of a liquid crystal panel are laminated on each other to make the total thickness from 10 to 100 mm and make the machining allowance from 0.5 to 10 mm. One example of appropriate conditions of fullback machining is: spindle rotation rate: 4,500 rpm and work feed rate: 800 mm/minute. The machining precision and machining efficiency are both good in such conditions. It is suitable to decrease the total thickness when the machining allowance is large and increase the total thickness when the machining allowance is small.

The fullback machining mentioned above removes the threadlike fracture pieces of the end faces of the polarization plates 50 to prevent the liquid crystal panel from being deteriorated in quality caused by the threadlike fracture pieces.

SUMMARY OF THE INVENTION

Although quality and reliability of the conventional polarization plate 50 has been established, there are still some points to be improved in design. For example, there are fears that the polarizer 51 may be deteriorated by the seeping of moisture from outside because the polarizer protective films 52a, 52b made of triacetyl cellulose-based resin exhibit high moisture permeability. The moisture permeability of the polarizer protective films 52a, 52b made of triacetyl cellulose-based resin is typically about 800 g/m$^2$·24 h (Measurement of moisture permeability conforms to JIS Z 0208 ("Moisture Permeability Test Method for Moisture-proof Packaging Material")). Further, there are fears that inclusion of moisture in the polarizer protective films 52a, 52b made of triacetyl cellulose-based resin may change optical properties, such as the difference between the phase difference of transmitted light and the designed value.

It is possible to improve moisture resistance of a polarizer and a polarization plate by using a polarizer protective film having moisture permeability lower than a polarizer protective film made of triacetyl cellulose-based resin, for example, a polarizer protective film made of norbornene-based resin or a polarizer protective film made of acrylic-based resin at least as one of a pair of polarizer protective films to prevent moisture from seeping. The polarizer protective film made of norbornene-based resin has moisture permeability of about 10 g/m$^2$·24 h to 100 g/m$^2$·24 h and the polarizer protective film made of acrylic-based resin has moisture permeability of about 88 g/m$^2$·24 h to 98 g/m$^2$·24 h and thus have smaller moisture permeability than the polarizer protective film made of triacetyl cellulose-based resin by a single digit. Accordingly, the use of the polarizer protective film made of norbornene-based resin and the polarizer protective film made of acrylic-based resin makes it possible to prevent defects, such as deterioration of the polarizer caused by the intrusion of moisture from the outside or changes in optical properties caused by the inclusion of moisture in the polarizer protective films themselves.

However, in the case of a polarization plate using a polarizer protective film made of norbornene-based resin having low moisture permeability or a polarizer protective film made of acrylic-based resin, there are fears that moisture contained in the polarizer may be locked inside the polarization plate. Therefore, moisture inside the polarization plate expands to apply stress to the polarizer when the polarization plate is exposed to a high temperature atmosphere, such as in cars, or in the heat, which may result in production of microcracks in the polarizer, taking a fullback machining trace as a starting point. In addition, when the kind of the polarizer protective films are different in the front and back sides, for example, when one of the polarizer protective films is made of norbornene-based resin and the other is made of triacetyl cellulose-based resin, the thermal expansion of the polarizer protective films is different between the face side and back side of the polarization plate (For example, the polarizer protective film made of norbornene-based resin has a linear expansion of about $6.8 \times 10^{-5}/K$ and the polarizer protective film made of triacetyle cellulose-based resin has a linear expansion of about $3.8 \times 10^{-5}/K$). In this case, it is repeated that the polarization plate becomes warped or does not become warped according to changes in an ambient temperature, so that a bending stress is applied to the polarizer, which may result in microcracks in the polarizer, taking the fullback machining trace as a starting point.

The present invention is made to solve the aforementioned conventional problems. It is an object of the present invention to provide a superior polarization plate having little deterioration, even if the polarization plate is exposed to an environment having ambient temperature changes.

In a first preferred embodiment, a polarization plate according to the present invention comprises: a polarizer; and a pair of transparent polarizer protective films, wherein the pair of polarizer protective films are laminated on both face surfaces of the polarizer by bonding to each other through an adhesive layer, and a face side of the periphery end face is a surface formed by solidifying after melting.

In a second preferred embodiment, the polarization plate according to the present invention has arithmetic average surface roughness Ra of 250 nm or lower on an end face when the measurement range is 20 μm×20 μm.

In a third preferred embodiment, the polarization plate according to the present invention has arithmetic average surface roughness Ra of 70 nm or lower on an end face when the measurement range is 20 μm×20 μm and waviness of the polarization plate is corrected.

In a fourth preferred embodiment of the polarization plate according to the present invention, at least one of a pair of polarizer protective films has moisture permeability of 5 g/m²·24 h to 200 g/m²·24 h.

In a fifth preferred embodiment of the polarization plate according to the present invention, at least one of a pair of polarizer protective films is a polarizer protective film made of transparent norbornene-based resin.

In a sixth preferred embodiment of the polarization plate according to the present invention, at least one of a pair of polarizer protective films is a polarizer protective film made of transparent acrylic-based resin.

In a seventh preferred embodiment of the polarization plate according to the present invention, an adhesive layer has a thickness of 50 to 500 nm.

In an eighth preferred embodiment of the polarization plate according to the present invention, the adhesive layer is composed by dispersing a metal compound colloid in a polyvinyl alcohol-based adhesive.

In a ninth preferred embodiment of the polarization plate according to the present invention, the adhesive layer contains polyvinyl alcohol-based resin, a cross linking agent, and a metal compound colloid, wherein the metal compound colloid is an aluminum oxide colloid having an average particle size of 1 to 50 nm, and the ratio by weight of aluminum oxide in the adhesive layer is 30 to 150 weight parts of aluminum oxide with respect to 100 weight parts of polyvinyl alcohol-based resin.

In a tenth preferred embodiment of the polarization plate, a peripheral end face is cut by laser.

Advantage of the Invention

Since the end face of the polarization plate of the present invention is a surface formed by solidifying after melting, no steep protrusions and recesses are seen, although there is sloping waviness on the end face. There are few triggers that may cause microcracks because the end face in such a sloping form has extremely few stress-concentrated part. This prevents microcracks from easily being produced to improve durability of the polarization plate, even if the polarization plate warps due to temperature changes and moisture within the polarization plate expands.

DESCRIPTION OF THE PREFERRED EMBODIMENTS

Figure 1:
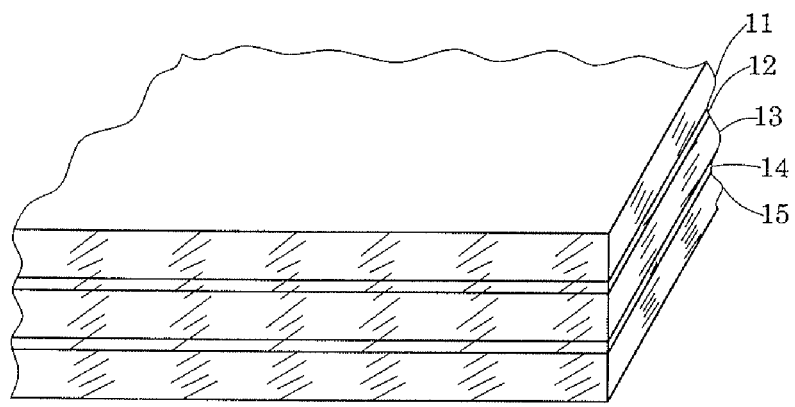
FIG. 1 is a schematic view of a polarization plate cut by laser.

A polarization plate of the present invention is composed of a multi-layer plate laminated by a polarizer, a pair of transparent polarizer protective films through an adhesive layer.

As a polarizer for a polarization plate according to the present invention, a film extended in one direction after including an iodine complex, such as a dichromatic dye or the like in a polyvinyl alcohol-based film is suitable. The polarizer preferably has a thickness of 60 μm or the like.

A polarizer protective film made of transparent triacetyl cellulose-based resin, a polarizer protective film made of transparent norbornene-based resin, and a polarizer protective film made of acrylic-based resin or the like can be used as polarizer protective films of the polarization plate according to the present invention. However, at least one of a pair of polarization protective films is a polarizer protective film made of norbornene-based resin or a film having low moisture permeability, such as a polarizer protective film made of acrylic-based resin. The term "a film having low moisture permeability" herein means a film having moisture permeability of 5 g/m²·24 h to 200 g/m²·24 h. The film having low moisture permeability, such as the polarizer protective film made of norbornene-based resin and the polarizer protective film made of acrylic-based resin can improve moisture resistance of the polarization plate by preventing moisture from entering from outside. Further, the polarizer protective film itself contains moisture so that optical property changes can also be prevented.

In terms of the suitable thickness of each polarizer protective film, the thickness of the polarizer protective film made of triacetyl cellulose-based resin is about 80 µm, the thickness of norbornene-based resin is about 40 µm, and the thickness of the polarizer protective film made of acrylic-based resin is about 40 µm.

A polyvinyl alcohol-based adhesive wherein a cross linking agent is mixed with a polyvinyl alcohol solution is preferably used for the polarizer protective film made of triacetyl cellulose-based resin as an adhesive used for bonding the polarizer of the polarization plate to the polarizer protection films of the present invention. An adhesive wherein a metal compound colloid has been dispersed on the polyvinyl alcohol-based adhesive is preferably used for the polarizer protective film made of norbornene-based resin and the polarizer protective film made of acrylic-based resin. The polyvinyl alcohol-based adhesive wherein the metal compound colloid has been dispersed is used to prevent defects such as folds to be described below from being produced. Since no folds are produced on the side of the polarizer protective film made of triacetyl cellulose-based resin, it is not needed to use a polyvinyl alcohol-based adhesive wherein a metal compound colloid has been dispersed.

A metal compound colloid, such as aluminum oxide, silicon oxide, zirconium oxide, titanium oxide or the like can be used as a metal compound colloid to be dispersed to the adhesive in the polarization plate of the present invention. Among them, an aluminum oxide colloid having an average particle size of 1 to 50 nm is preferably used. Further, the ratio by weight of aluminum oxide in the adhesive is preferably 30 to 150 weight parts of aluminum oxide with respect to 100 weight parts of polyvinyl alcohol-based resin.

The adhesive layer in the polarization plate of the present invention preferably has a thickness of 50 to 500 nm.

The polarization plate of the present invention is cutting worked on the peripheral end face when the polarization plate is cut out by laser from the polarization plate material. No steep protrusions and recesses are shown and the end face is sloping unlike a machined surface because the end face cutting worked by laser is a surface that has been solidified after being melted once. Such a sloping end face has few triggers that may produce microcracks. This prevents the end face from easily microcracking compared with the machined surface, even if the polarization plate warps and moisture within the polarization plate expands. Therefore, the polarization plate of the present invention has high durability against temperature changes.

As a typical example of the polarization plate of the present invention, a polarization plate, wherein a polarizer protective film made of transparent norbornene-based resin is used as one of a plurality of polarizer protective films and a polarizer protective film made of transparent triacetyl cellulose-based resin is used as the other of the plurality of polarization protective films will be described below.

EXAMPLE

Example

Figure 2:
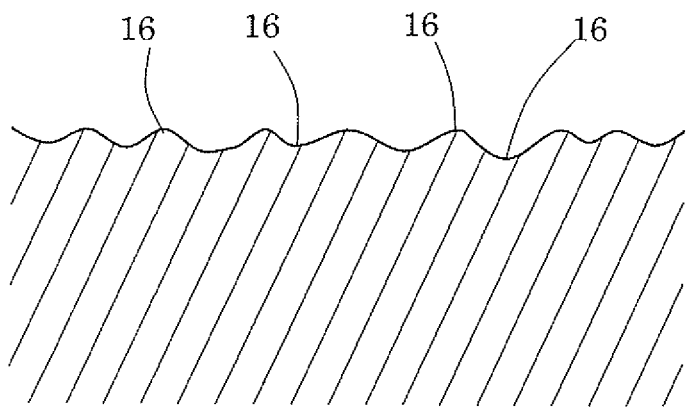
FIG. 2 is a cross-sectional view of a polarization plate cut by laser.

FIG. 1 is a schematic view of a polarization plate 10 of one embodiment of the present invention. FIG. 2 is a schematic view of a cross-section of an end face of the polarization plate 10 of the present invention seen from an arrow direction in FIG. 1. The polarization plate 10 was made by being cut out by laser from the polarization plate material. The polarization plate 10 comprises: a polarizer protective film 11 made of transparent triacetyl cellulose-based resin (thickness: 80 µm); an adhesive layer 12 made of polyvinyl alcohol-based resin (thickness: 130 nm); a polarizer 13 (thickness: 60 µm); an adhesive layer 14 wherein a metal compound colloid has been dispersed on a polyvinyl alcohol-based adhesive (thickness: 130 nm); and a polarizer protective film 15 made of transparent norbornene-based resin (thickness: 40 µm). The polarizer protective film 11 made of a triacetyl cellulose-based resin had moisture permeability of 750 g/m²·24 h and the polarizer protective film 15 made of a norbornene-based resin had moisture permeability of 10 g/m²·24 h (Measurement of moisture permeability conforms to JIS Z 0208 "Moisture Permeability Test Method for Moisture-proof Packaging Material")). Further, the thickness of the adhesive layers 12 and 14 is preferably 50 to 500 nm.

The adhesive layer 14 includes polyvinyl alcohol-based resin, a cross linking agent, and a metal compound colloid. Examples of the metal compound colloid include aluminum oxide, silicon oxide, zirconium oxide, titanium oxide or the like. Particularly, a substance wherein aluminum oxide (alumina) particles are colloid-dispersed in water is preferable. The average particle size of the aluminum oxide particles is preferably 1 to 50 nm. Further, the average particle size of the aluminum oxide particles in colloid was measured by a dynamic light scattering method with a particle size distribution apparatus (NIKKISO CO., LTD., Nanotrac UPA150). Furthermore, the ratio by weight of aluminum oxide in the adhesive layer 14 was 30 to 150 weight parts of oxide aluminum with respect to 100 weight parts of polyvinyl alcohol-based resin.

The purpose of using the adhesive layer 14 wherein a metal compound colloid has been dispersed on the polyvinyl alcohol-based adhesive is to prevent the generation of defects called "folds". In the case where the polarizer 13 and the polarizer protective film 15 made of norbornene-based resin are bonded to each other with the adhesive layer 12 made of polyvinyl alcohol-based resin which is not including a metal compound colloid, local defects called "folds" may appear on an interface between the polarizer 13 and the polarizer protective film 15. Since portions where folds appear are seen like creases when packed to a liquid crystal panel, there are fears that these folds may be defective appearance due to being very prominent. While it is necessary to prevent the folds from appearing, according to studies of the applicant of the present invention, it is possible to control the generation of folds in the polarization plate 10 by bonding the polarizer protective film 15 to the polarizer 13 through the adhesive layer 14 wherein the metal compound colloid has been dispersed on the polyvinyl alcohol-based adhesive.

Although, norbornene-based resin is used as the polarizer protective film 15 in the polarization plate 10, for example, when acrylic-based resin is used as a material of the polarizer protective film, folds may appear. Accordingly, the adhesive layer 14 wherein the metal compound colloid has been dispersed on the polyvinyl alcohol-based adhesive is also preferably used for the polarizer protective film made of acrylic-based resin. However, in the case of using the polarizer protective film 11 made of triacetyl collulose-based resin, it is not necessary to use the adhesive layer 14 wherein the metal compound colloid has been dispersed on the polyvinyl alcohol-based adhesive on the side of the polarizer protective film 11 made of triacetyl cellulose-based resin.

In the polarization plate 10 of the present invention, the peripheral end face is cut by laser when cutting out from the material. Laser irradiated to the material of the polarization plate 10 from upward is absorbed in the polarizer protective film 11, the adhesive layer 12, the polarizer 13, the adhesive layer 14, and the polarizer protective film 15 in order. Respective films are melted by energy of laser to cut the material of the polarization plate. Laser may be reversely irradiated from the side of the polarizer protective 15 when cutting the material.

As shown in FIG. 2, a cut surface (peripheral end face) of the polarization plate 10 whose periphery has been cut by laser is a sloping plane and no steep protrusions and recesses are seen, although sloping micro waviness 16 is shown on the surface. In the case of laser cutting, no pointed structure is easily formed because the end face (cut surface) is melted by the absorption of laser and then is solidified. However, timing of solidification is subtly different depending on the place, so that the sloping waviness 16 is assumed to be formed. The measured value of the arithmetic average surface roughness Ra was 222 nm when the measurement range of an optical profiler (Surface Roughness Measuring Device) of the sample end face of the polarization plate 10 was 20 μm×20 μm.

Figure 3:
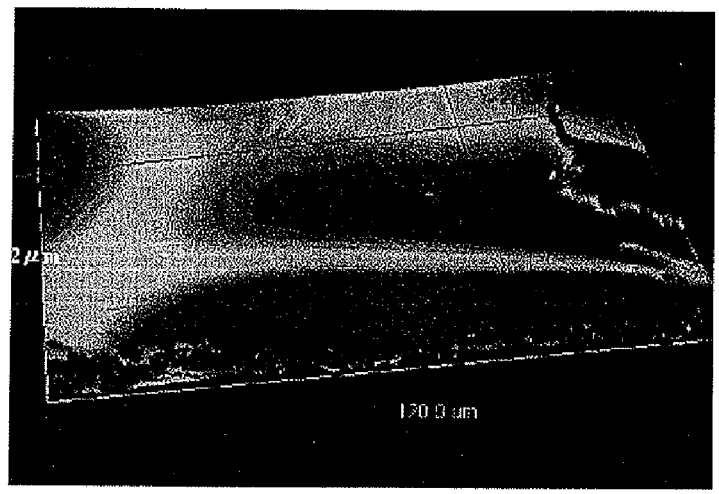
FIG. 3 shows a three-dimensional image of the polarization plate cut by laser.

FIG. 3 is a three-dimensional image of an end face of the polarization plate 10 by an optical profiler. The range of the three-dimensional image is 120 μm wide and 92 μm long and recess portions of the micro waviness 16 in the center of the display and slope portions of protrusions on both ends of the display are seen. The micro waviness 16 respectively has a cycle of about 150 μm. The surface is so smooth that no microstructure of a few μm is seen. This is because the surface layer has been solidified after having been melted once.

Figure 4:
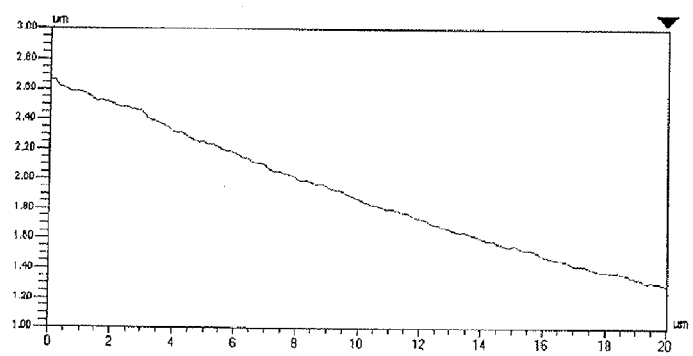
FIG. 4 shows a cross-sectional profile of an end face of the polarization plate cut by laser (before correcting waviness)
Figure 4:
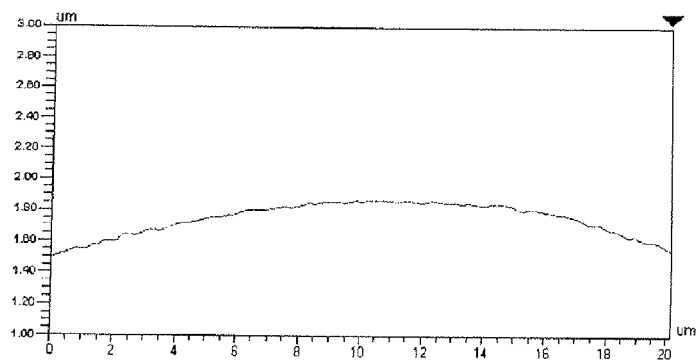

FIG. 4 is part of a cross-sectional profile of the end face of the polarization plate 10 in an X direction (width direction) and a Y direction (length direction). The arithmetic average surface roughness Ra is 220 nm when the measurement range is 20 μm×20 μm because waviness and roughness is not separated in FIG. 4. However, as is clear from the profile, the arithmetic average surface roughness Ra is assumed to include waviness as a factor.

Figure 5:
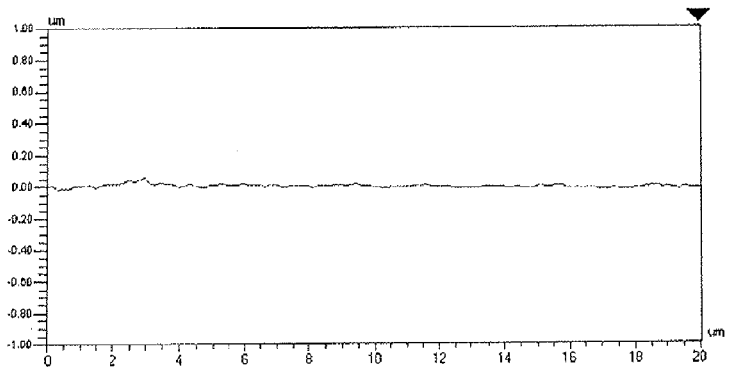
FIG. 5 shows a cross-sectional profile of an end face of the polarization plate cut by laser (after correcting waviness)
Figure 5:
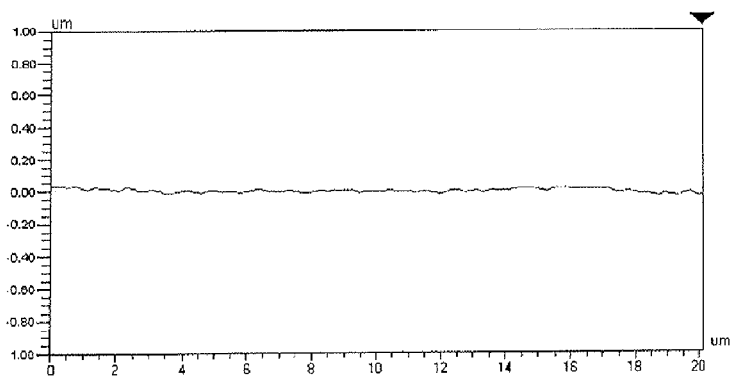

FIG. 5 is a profile where waviness has been corrected by setting the cutoff value at 4 μm by JIS B 0601 2001 to remove the effects of waviness. As is clear from FIG. 5, the arithmetic average surface roughness Ra of the end face is 10 nm which is extremely small. The arithmetic average surface roughness Ra in which waviness has been corrected on the end face of the polarization plate 10 regarding other three points was 19 nm, 32 nm, and 54 nm.

The measuring device used at this time was an optical profiler manufactured by JAPAN VEECO Co., LTD.; Wyko NT3300 (Depth direction resolution: 1 nm, in-plane resolution: 0.5 μm), the measurement range is 20 μm×20 μm and the measuring mode is a vertical scanning-type interference mode. Further, the definition of the arithmetic average surface roughness Ra conforms to JIS B 0601 2001 "Geometrical Characteristic Specifications of Products (GPS)-Surface Texture: Contour System-Terms and Definition and Surface Texture Parameter."

Generally, a polarization plate is incorporated into a liquid crystal panel and then receives heat history of heating and cooling. To confirm the degree of incidence of failure of the polarization plate due to this, a heat cycle test of heating and cooling on a polarization plate only has been conducted to confirm heat cycle resistance of the polarization plate only.

When the polarizer plate 10 is deteriorated in a heat cycle test, microcracks may appear on the polarizer 13. Typical microcracks have a width of about 1 μm and a length up to about 3 mm.

Figure 6:
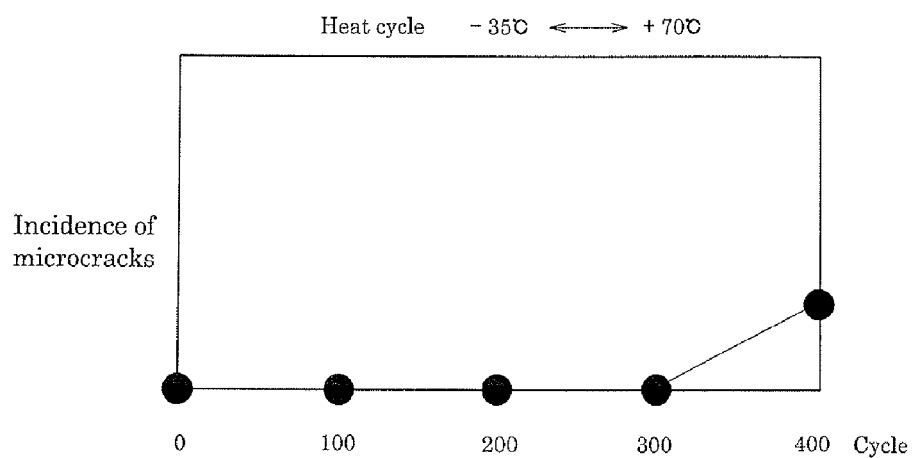
FIG. 6 is a heat cycle test result of the polarization plate cut by laser.

FIG. 6 shows the incidence rate of microcracks in the polarization plate 10 of the present invention in a heat cycle test. Conditions of the heat cycle is [−35° C. (1 hour)·temperature change (5 minutes)·+70° C. (1 hour)·temperature change (5 minutes) is 1 cycle and the horizontal axis indicates the number of heat cycles (0 cycle, 100 cycles, 200 cycles, 300 cycles, and 400 cycles), and the vertical axis indicates the incidence rate of microcracks (arbitrary unit). Microcracks are not produced in the polarization plate 10 whose peripheral end face has been cut by laser until 300 cycles but occur for the first time at 400 cycles.

Figure 7:
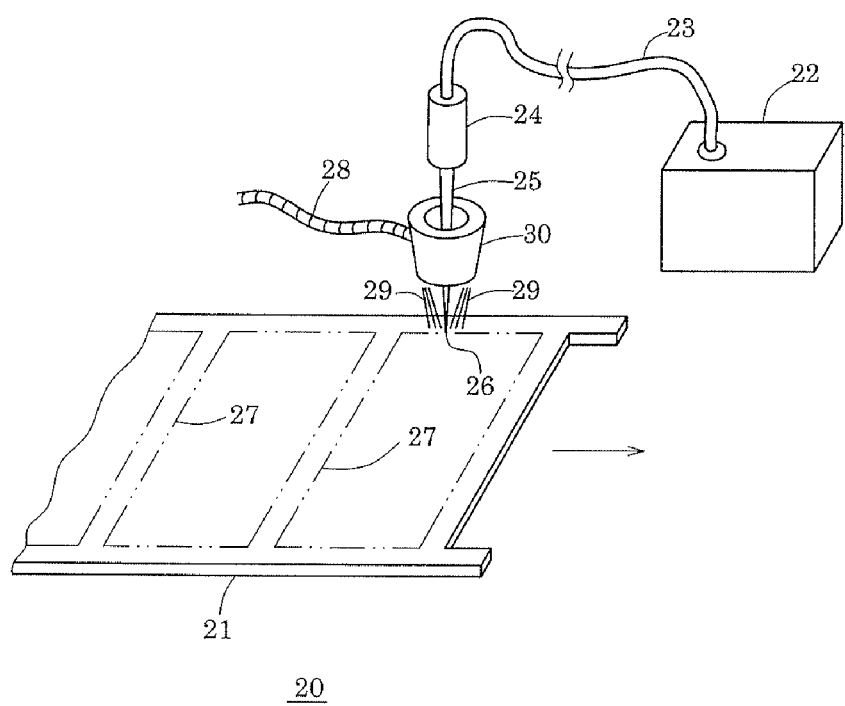
FIG. 7 is a schematic view of a laser cutting device.

FIG. 7 is a schematic view of a laser cutting device 20 to cut the material of the polarization plate 10 by laser. A rectangular polarization plate in a size of a liquid crystal panel is cut out from a material 21 using the laser cutting device 20. Laser generated by a laser light source device 22 is led to a collective lens 24 through an optical fiber 23. When a laser 25 is irradiated from the collective lens 24 after focusing on the material 21, an irradiation position 26 is melted to cut the material 21. Movement of the laser 25 along rectangles 27 in two-point line as large as a liquid crystal panel makes it possible to cut out a polarization plate in a size of a liquid crystal.

When the material 21 is melted by the irradiation of the laser 25, melted film scraps may scatter around the irradiation position 26. When the film scraps residue on the surface of the polarization plate, there are fears that the polarization plate may not be used. To avoid this, high-pressure assist gas 29 supplied through an assist gas pipe 28 is blown out from an assist gas nozzle 30 to apply to the periphery of the irradiation position 26. Since the melted film scraps are blown out by the assist gas 29, the film scraps become disappear on the polarization plate.

One example of conditions of suitable laser cutting when cutting out a polarization plate from the material 21 is as mentioned below. The kind of laser is carbon dioxide gas laser, wavelength: 10.6 μm, power: about 70 W, oscillation mode: pulse oscillation, oscillation pulse width: 0.003 second, oscillation pulse interval: 0.02 second, so that duty ratio: 15%, transfer rate of the irradiation position 26: 20 m/minute to 25 m/minute. Diameter of laser beam: about 170 to 200 μm, the assist gas 29: dried air, gas pressure of the assist gas 29: about 0.2 MPa, diameter of the assist gas nozzle 30: about 2.6 mm.

Melted scraps by laser are removed by the assist gas 29 and do not remain on the surface of the polarization plate. Further, no foreign matters, such as threadlike fracture pieces produced by the cutting-out with a cutter for punching are produced. Therefore, further finishing of the end face of the polarization plate after laser cutting is not needed, which enables to perform laser cutting at the final external dimensions from the start.

The laser cutting device 20 can be used for any polarization plates using a variety of polarizer protective films, such as polarizer protective films made of triacetyl cellulose-based resin and polarizer protective films made of norbornene-based resin, and polarizer protective films made of acrylic-based resin or the like, and the cutting of materials of the polarization plates. In any polarization plates, the laser cut surfaces have sloping flat surface and no pointed structure is seen as shown in FIG. 2. This makes microcracks difficult to appear on any polarization plates, even if the polarization plates warp and moisture within the polarization plates expands, resulting in high durability against temperature changes.

Comparative Example

Figure 8:
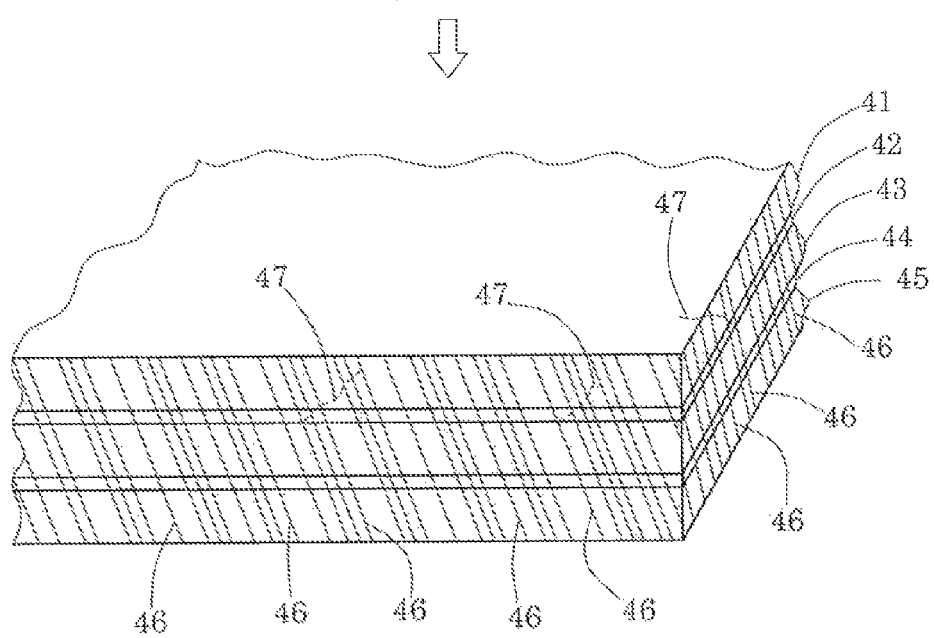
FIG. 8 is a schematic view of a fullback worked polarization plate.
Figure 9:
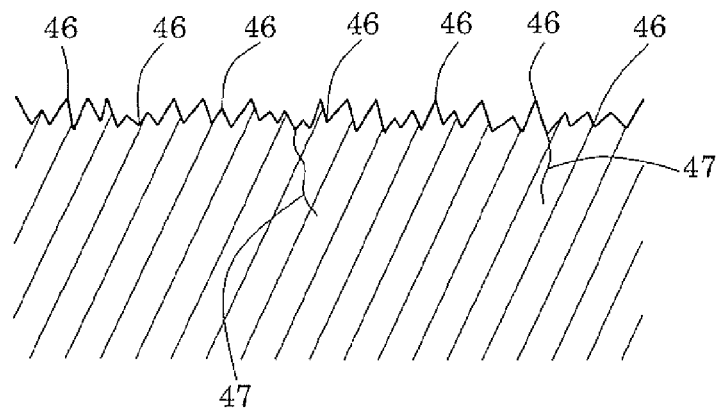
FIG. 9 is a cross-sectional view of the end face of the fullback worked polarization plate.

FIG. 8 is a schematic view of a polarization plate 40 worked with end face finish by fullback machining with a conventional milling machine. FIG. 9 is a schematic view of a cross section of the end face of the polarization plate 40 seen from an arrow direction. The configuration of the polarization plate 40 is the same as that of the polarization plate 10 in Example of the present invention. The polarization plate 40 comprises: a polarizer protective film 41 made of triacetyl cellulose-based resin (thickness: 80 μm); an adhesive 42 made of polyvinyl-based resin (thickness: 130 nm); a polarizer 43 (thickness: 60 μm); an adhesive layer 44 wherein a metal compound colloid is dispersed on a polyvinyl alcohol-based adhesive (thickness: 130 nm); and a polarizer protective film 45 made of norbornene-based resin (thickness: 40 μm).

As shown in FIGS. 8 and 9, there are a number of parallel grooves 46 which could be traces of the cut end faces at the time of fullback machining on the end face of the polarization plate 40 with end face finish by fullback machining. Each pitch of the grooves 46 is about 30 μm and their cross-sectional shape of the composed of steep protrusions and recesses. The measured value in the arithmetic average surface roughness Ra of the grooves 46 portions on the end face of the polarization plate 40 by an optical profiler (surface roughness measuring device) was 272 nm. The surface roughness measuring device used this time was an optical profiler manufactured by JAPAN VEECO Co., LTD.; Wyko NT3300 (Depth direction resolution: 1 nm, in-plane resolution: 0.5 μm), the measurement range is 20 μm×20 μm and the measuring mode is a vertical scanning-type interference mode, as well as the surface roughness measuring device used for the polarizer plate 10 in the present invention. Further, the definition of the arithmetic average surface roughness Ra conforms to JIS B 0601 2001 "Geometrical Characteristic Specifications of Products (GPS)-Surface Texture: Contour System-Terms and Definition and Surface Texture Parameter."

Figure 10:
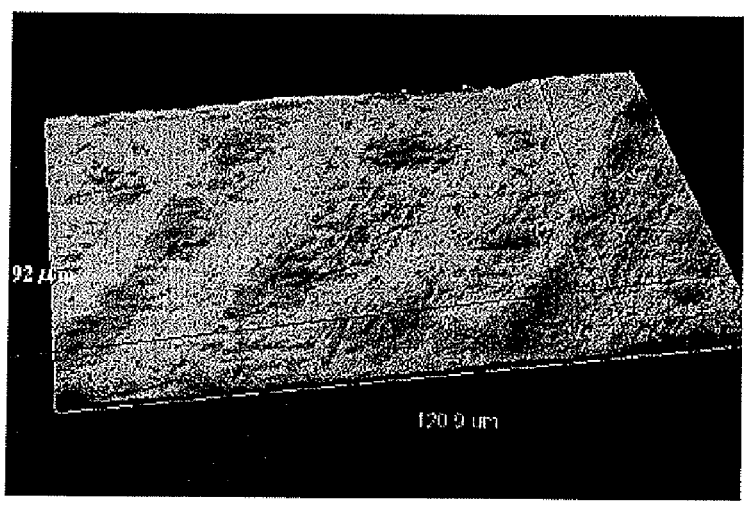
FIG. 10 shows a three-dimensional image of the end face of the fullback worked polarization plate.

FIG. 10 is a three-dimensional image of the end face of the polarization plate 40 worked with fullback machining by an optical profiler. The range of this three-dimensional image is 120 μm wide and 92 μm long and three to four pieces of grooves 46 having a cycle of about 30 μm are seen in the image. Rough microstructures having a size of a few μm are seen on the whole surface in addition to such large grooves 46. These microstructures could be produced because the surface layer of the end face of the polarization plate 40 has been mechanically peeled off at the time of fullback machining. Neither such grooves 46 nor microstructures are seen in the polarization plate 10 of the present invention worked by laser cutting.

Figure 11:
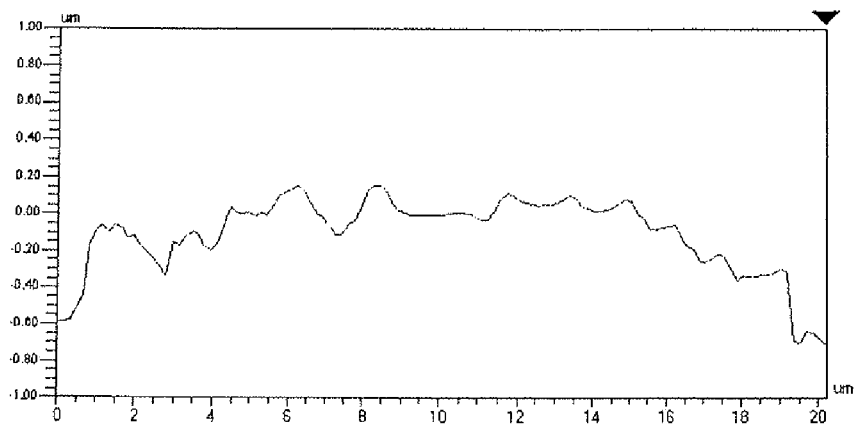
FIG. 11 is a cross-sectional profile of the end face of the fullback worked polarization plate (before collecting waviness)
Figure 11:
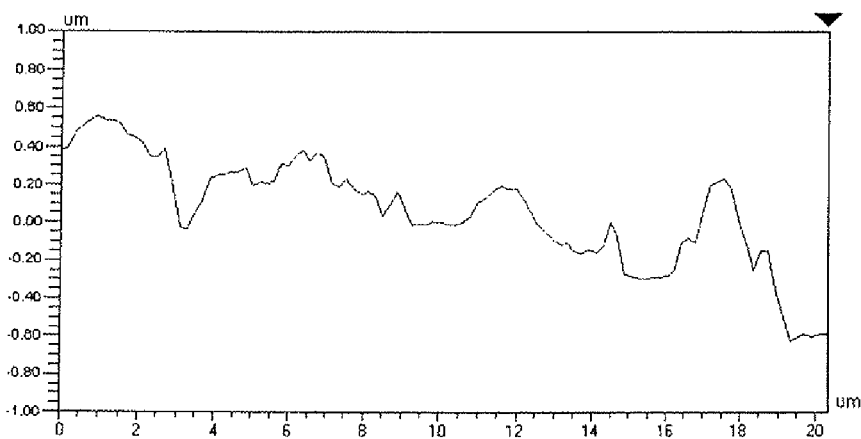

FIG. 11 is a cross-sectional profile of the X direction (horizontal direction) and Y direction (vertical direction) of part of the end face of the polarization plate used in Comparative Example. Since waviness and roughness on the surface is not separated in FIG. 11, the arithmetic average surface roughness Ra was 280 nm in the measurement range of 20 μm×20 μm. It is not clear from this cross-sectional profile as to either waviness or roughness is main in the arithmetic average surface roughness Ra.

Figure 12:
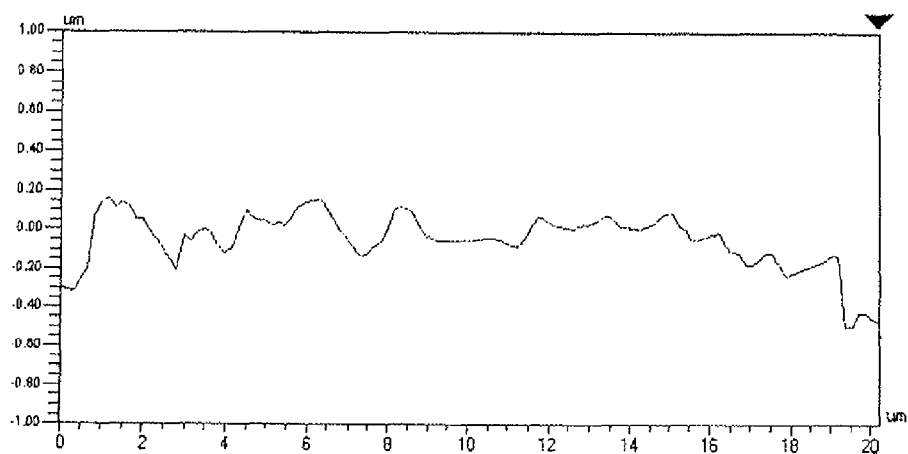
FIG. 12 shows a three-dimensional image of the end face of the fullback worked polarization plate (after correcting waviness)
Figure 12:
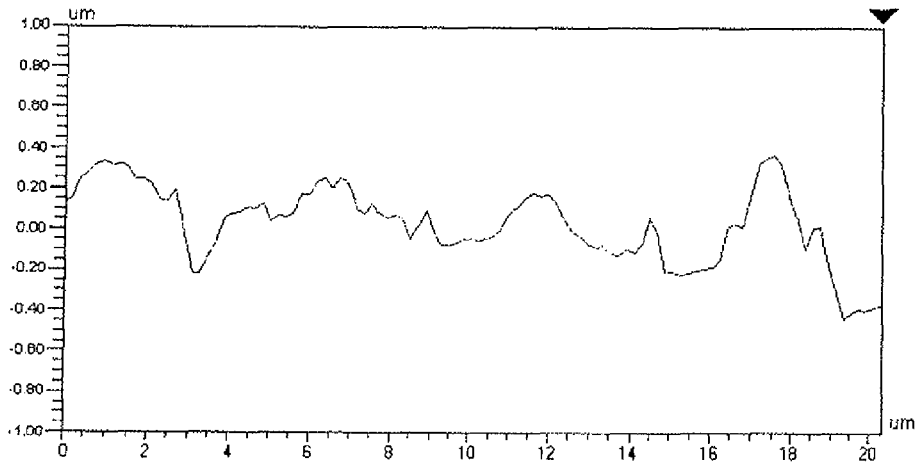

FIG. 12 is a profile in which waviness has been corrected by setting a cutoff value at 4 μm in accordance with JIS B 0601 2001 to remove the effect of the waviness. As is apparent from FIG. 12, the arithmetic average surface roughness Ra of the end face is 130 nm. In the Comparative Example, when other three points were measured, the arithmetic average surface roughness Ra of these three points was 157 nm, 179 nm, and 230 nm.

Figure 13:
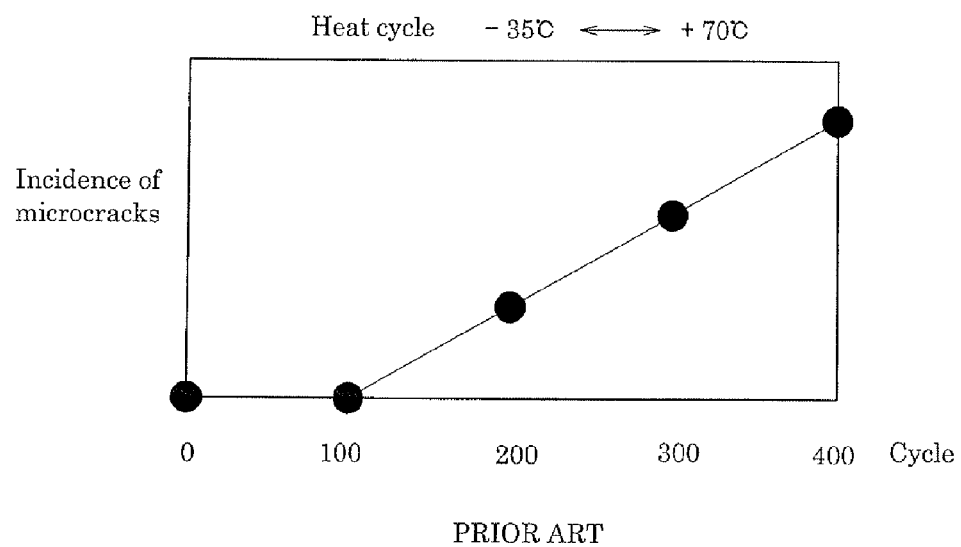
FIG. 13 is a heat cycle test result of the fullback worked polarization plate.
Figure 14:
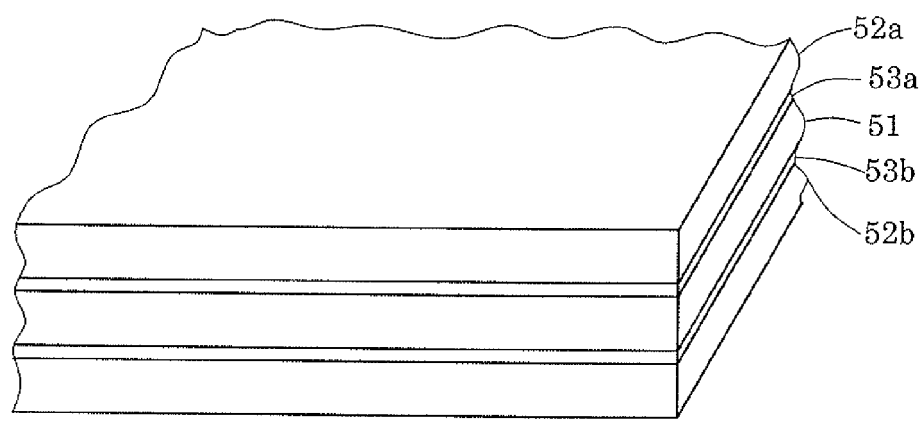
FIG. 14 is a schematic view of a general polarization plate.

FIG. 13 shows an incidence rate of microcracks of the conventional polarization plate 40 with its end face worked by fullback machining in a heat cycle test. Conditions of the heat cycle is the same as those of the polarization plate 10 of the present invention; [−35° C. (1 hour)·temperature change (5 minutes)·+70° C. (1 hour)·temperature change (5 minutes) is 1 cycle and the horizontal axis indicates the number of heat cycles (0 cycle, 100 cycles, 200 cycles, 300 cycles, and 400 cycles), and the vertical axis indicates the incidence rate of microcracks (arbitrary unit).

As shown in FIG. 13, although no microcracks are produced in the conventional polarization plate 40 with its end face worked by fullback machining until the number of the heat cycle is 100 cycles, microcracks are produced at 200 cycles. The incidence rate of microcracks is linearly increased between 300 to 400 cycles. According to studies of the inventors of the present invention, as shown in FIGS. 8 and 9, the microcracks 47 tend to appear from the recessed portions of the grooves 46. The reason is assumed that distortion stress caused by machining intensively remains on the recessed portions and the microcracks 47 develop setting the recesses of the grooves 46 as starting point by thermal stress. Typical size of the microcracks is about 1 μm wide and a maximum of about 3 mm long.

[Comparison Investigation Between Example and Comparative Example]

The arithmetic average surface roughness Ra of the end face of polarization plates will now be compared. The arithmetic average surface roughness Ra of the polarization plate 40 worked by conventional fullback machining was 272 μm when no correction of waviness is made. On the other hand, the arithmetic average surface roughness Ra of the polarization plate 10 cut by laser was 222 μm. Accordingly, it appears that there is threshold for the incidence rate of microcracks near Ra=250 nm. That is, when the arithmetic average surface roughness Ra is 250 nm or lower, the incidence rate of microcracks is lower and when the arithmetic average surface roughness Ra is over 250 nm, the incidence rate of microcracks is higher. In the case of correcting waviness, the arithmetic average surface roughness Ra of the polarization plate 40 worked by conventional fullback machining was 130 nm, 157 nm, 179 nm, and 230 nm. On the other hand, the arithmetic average surface roughness Ra of the polarization plate 10 of the present invention cut by laser was 10 nm, 19 nm, 32 nm, and 54 nm. Accordingly, it appears that there is threshold for the incidence rate of microcracks near Ra=70 nm. When waviness has been corrected, the incidence rate of microcracks is lower when the arithmetic average surface roughness Ra is 70 nm or lower and the incidence rate of microcracks is higher when the arithmetic average surface roughness Ra is over 70 nm.

Considering the thickness, that is, the whole length of the measurement range of the polarization plates, the measurement range of the arithmetic average surface roughness Ra is 20 μm×20 μm, which is not narrow but appropriate.

In view of the mechanism of the production of microcracks, however, whether there are the grooves 46 or not has an important impact on the production of microcracks, as well as the value of the surface roughness Ra. Distortion stress remains in the grooves 46 composed of steep protrusions and recesses is great in the polarization plate 40 worked by conventional fullback machining, which may lead to the production of the microcracks 47. On the other hand, no grooves composed of steep protrusions and recesses on the end face were seen and only sloping waviness 16 is seen in the polarization plate 10 of the present invention cut by laser, so that distortion stress could hardly remain. It is presumed that this may prevent microcracks form easily being produced. It is anticipated that the polarization plate 10 of the present invention cut by laser is far more difficult to produce microcracks, even in case that the surface roughness Ra of the polarization plate 40 worked by the conventional fullback machining is a little greater than the threshold of 250 nm and the surface roughness Ra of the end face of the polarization plate 10 of the present invention cut by laser is a little smaller than the threshold of 250 nm, which means that the difference between the surface roughness Ra of both polarization plates is subtle.

As shown in FIG. 6, while microcracks are not produced before reaching at 300 cycles in the polarization plate 10 of the present invention cut by laser, microcracks are produced after reaching at 400 cycles. On the other hand, in the polarization plate 40 worked by the conventional fullback machining, as shown in FIG. 13, microcracks are produced after reaching at 200 cycles. Accordingly, it is possible to extend a heat cycle life approximately two-fold by cutting the end face of the polarization plate by laser while the polarization plate 40 has the same material configuration. In addition, this effect is not limited to laser cutting because this effect is obtained after the surface of the end face has been melted once to be solidified.

Although microcracks are produced when the polarization plate 10 cut by laser reaches at 400 cycles, places having microcracks are not seen being concentrated on a certain position connected to the surface shape. This is deemed to mean that the sloping surface shape results in no places where stress is focused because the surface of the laser cut surface has been melted once to be solidified. Laser cutting is one means for forming a surface solidified after being melted once. Forming means is not limited to laser cutting because the effects of the present invention are obtained by forming the solidified surface after melting.

There has thus been shown and described a novel polarization plate which fulfills all the objects and advantages sought therefor. Many changes, modifications, variations, combinations and other uses and applications of the subject invention will, however, become apparent to those skilled in the art after considering this specification and the accompanying drawings which disclose the preferred embodiments thereof. All such changes, modifications, variations and other uses and applications which do not depart from the spirit or scope of the invention are deemed to be covered by the invention, which is to be limited only by the claims which follow.

What is claimed is:
1. A polarization plate comprising:
a polarizer; and
a pair of transparent polarizer protective films,
wherein the pair of polarizer protective films are laminated on both face surfaces of the polarizer by bonding to each other through an adhesive layer, and an end face is a surface formed by solidifying after melting,
wherein the polarization plate has arithmetic average surface roughness Ra of 250 nm or lower on the end face when a measurement range is 20 μm×20 μm.

2. A polarization plate comprising:
a polarizer; and
a pair of transparent polarizer protective films,
wherein the pair of polarizer protective films are laminated on both face surfaces of the polarizer by bonding to each other through an adhesive layer, and an end face is a surface formed by solidifying after melting,
wherein the polarization plate has arithmetic average surface roughness Ra of 70 nm or lower on the end face when a measurement range is 20 μm×20 μm and waviness of the polarization plate is corrected.

3. The polarization plate according to claim 1, wherein at least one of the pair of polarizer protective films has moisture permeability of 5 g/m$^2$·24 h to 200 g/m$^2$·24 h.

4. The polarization plate according to claim 2, wherein at least one of the pair of polarizer protective films has moisture permeability of 5 g/m$^2$·24 h to 200 g/m$^2$·24 h.

5. The polarization plate according to claim 1 or 2, wherein at least one of the pair of polarizer protective films is a polarizer protective film made of transparent norbornene-based resin.

6. The polarization plate according to claim 1 or 2, wherein at least one of the pair of polarizer protective films is a polarizer protective film made of transparent acrylic-based resin.

7. The polarization plate according to any one of claim 1, 2, 3 or 4, wherein the adhesive layer has a thickness of 50 to 500 nm.

8. The polarization plate according to claim 7, wherein the adhesive layer contains polyvinyl alcohol-based resin, a cross linking agent, and a metal compound colloid, the metal compound colloid is an aluminum oxide colloid having an average particle size of 1 to 50 nm, and the ratio by weight of aluminum oxide in the adhesive layer is 30 to 150 weight parts of aluminum oxide with respect to 100 weight parts of polyvinyl alcohol-based resin.

9. The polarization plate according to any one of claim 1, 2, 3 or 4, wherein the adhesive layer is composed by dispersing a metal compound colloid in a polyvinyl alcohol-based adhesive.

10. The polarization plate according to any one of claim 1, 2, 3 or 4, wherein the peripheral end face is cut by laser.

* * * * *